United States Patent [19]

Brody

[11] 4,100,763
[45] Jul. 18, 1978

[54] MULTI-SOURCE HEAT PUMP HVAC SYSTEM

[75] Inventor: Herbert M. Brody, Cherry Hill, N.J.

[73] Assignee: International Telephone & Telegraph Corporation, Nutley, N.J.

[21] Appl. No.: 789,903

[22] Filed: Apr. 22, 1977

Related U.S. Application Data

[63] Continuation of Ser. No. 698,233, Jun. 21, 1976, abandoned.

[51] Int. Cl.$^2$ .................. F25B 27/02; F25B 27/00; F25B 13/00; F25D 17/06
[52] U.S. Cl. .................................. 62/238; 62/2; 62/324; 62/412
[58] Field of Search ............... 62/2, 238, 324, 412, 62/79; 165/DIG. 2, DIG. 12; 126/101; 237/55; 122/20 B

[56] References Cited

U.S. PATENT DOCUMENTS

| | | | |
|---|---|---|---|
| 2,030,032 | 2/1936 | Keyes | 62/412 |
| 2,118,949 | 5/1938 | Scott | 62/412 |
| 2,252,046 | 8/1941 | Steele | 122/20 B |
| 2,667,766 | 2/1954 | Cummings | 62/238 |
| 3,203,875 | 8/1965 | Sturtevant | 62/238 |
| 3,299,651 | 1/1967 | McGrath | 62/238 |
| 3,789,621 | 2/1974 | Inuzuka | 62/324 |
| 3,916,638 | 11/1975 | Schmidt | 62/238 |
| 3,960,322 | 6/1976 | Ruff et al. | 62/238 |
| 3,976,123 | 8/1976 | Davies | 62/238 |
| 4,012,191 | 3/1977 | Lisankie et al. | 237/55 |

Primary Examiner—Lloyd L. King
Attorney, Agent, or Firm—John T. O'Halloran; Peter C. Van Der Sluys

[57] ABSTRACT

An HVAC system for a building of the type that has an interior zone and a perimeter zone includes an economizer type air conditioning unit for the interior zone and a multi-source heat pump for the perimeter zone. The interior zone economizer type air-conditioning unit has a waste heat recovery coil disposed at the exhaust air dampers and connected in a closed liquid circulating loop for recovering heat from the exhausted air. The multi-source heat pump functions as an air-to-air heat pump during a cooling mode of operation during which heat is withdrawn from the air to be conditioned by standard indoor evaporator coils, said heat being rejected to the outside air by a standard outdoor condenser coil. The heat pump operates as liquid-to-air heat pump during the heating mode of operation during which heat is extracted by a chiller from the closed liquid circulating loop and is discharged to the conditioned air through the indoor coils which act as condensers during the heating mode of operation. The closed liquid circulating loop interconnects the heat pump chiller, the waste heat recovery coil and a heat storage means and may also be connected to a supplemental heat source and a solar heat collector. It is also contemplated that one or more remote water source heat pumps may be connected into the closed liquid circulating loop for heating and cooling remotely located spaces.

25 Claims, 3 Drawing Figures

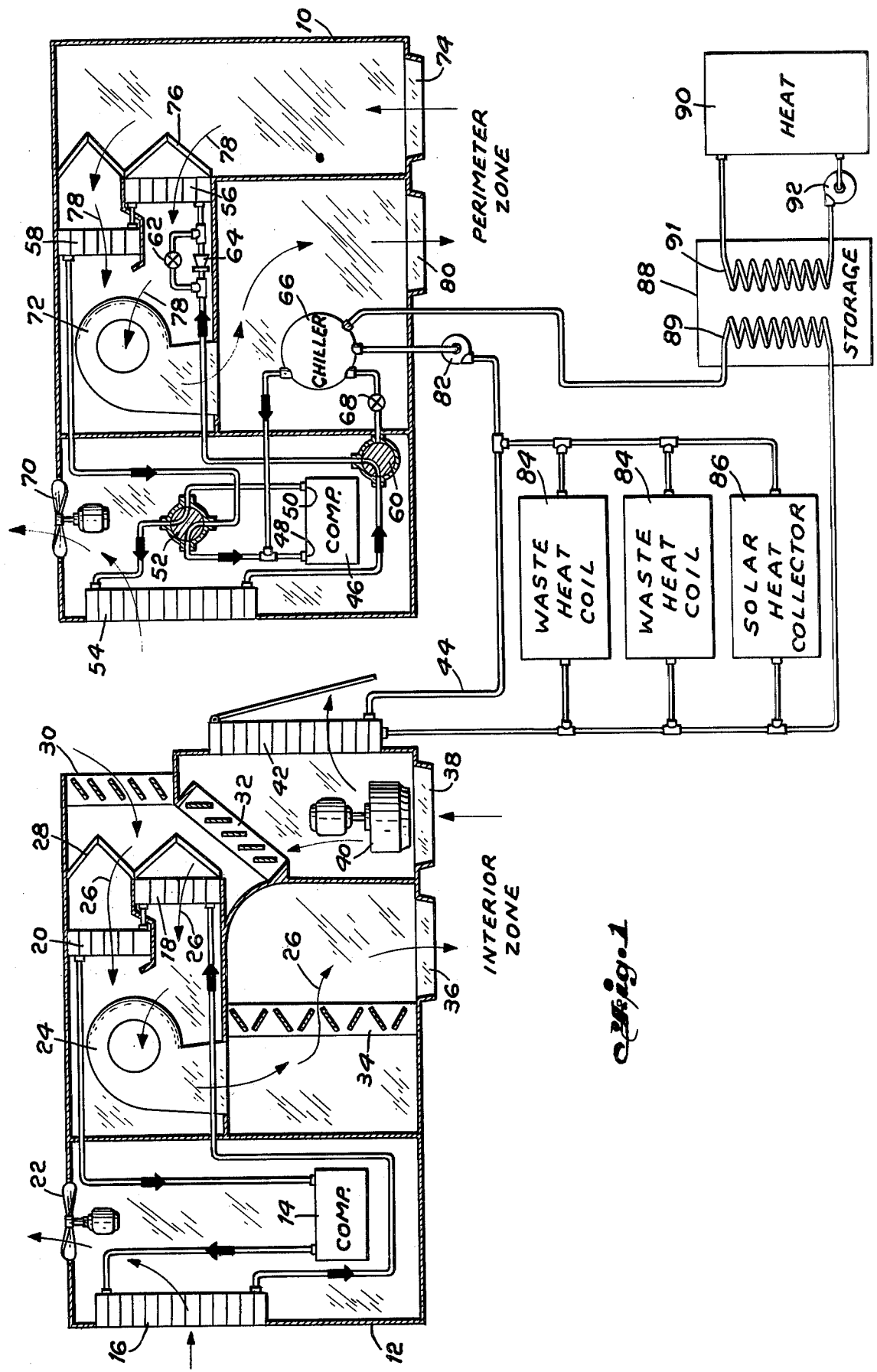

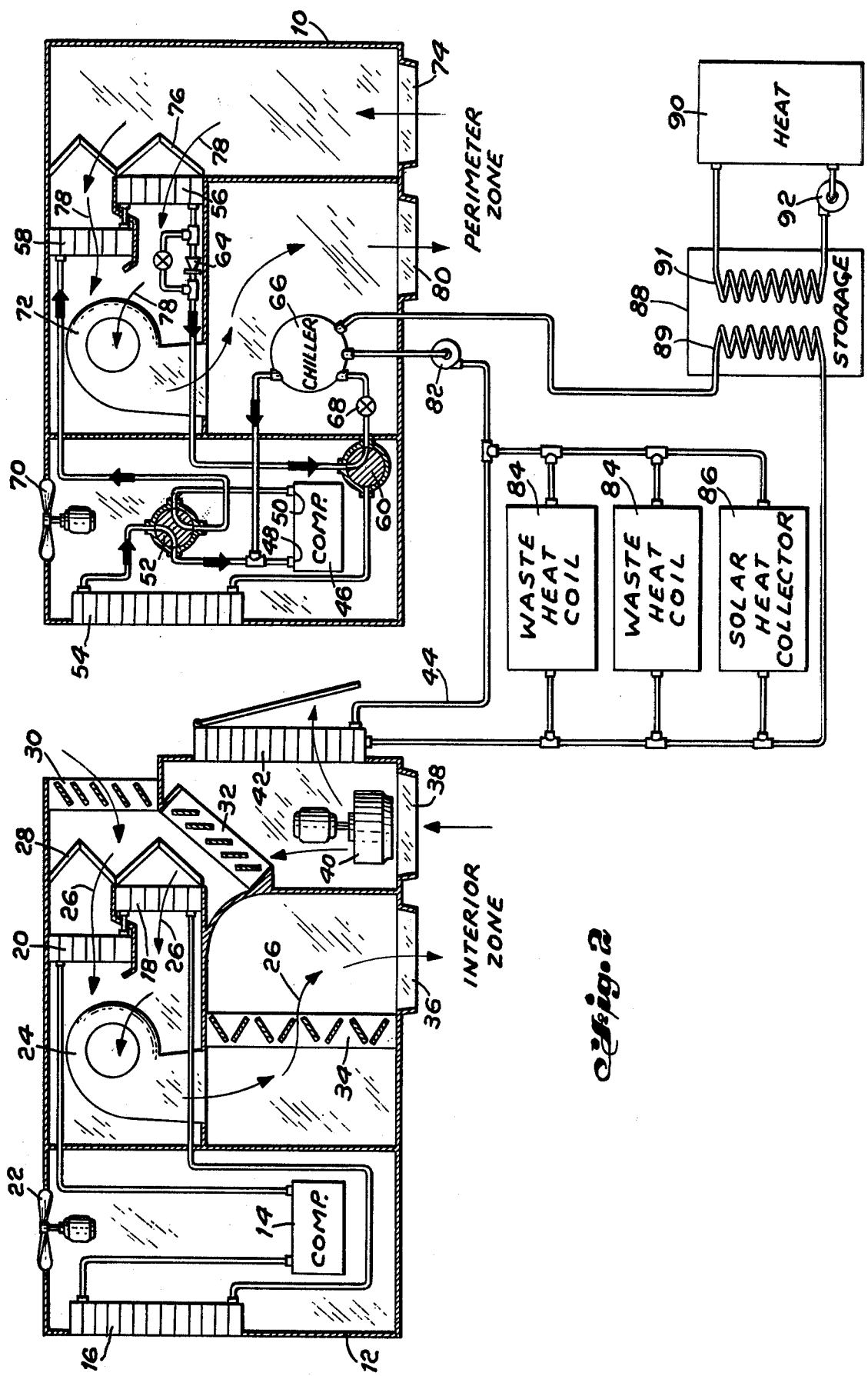

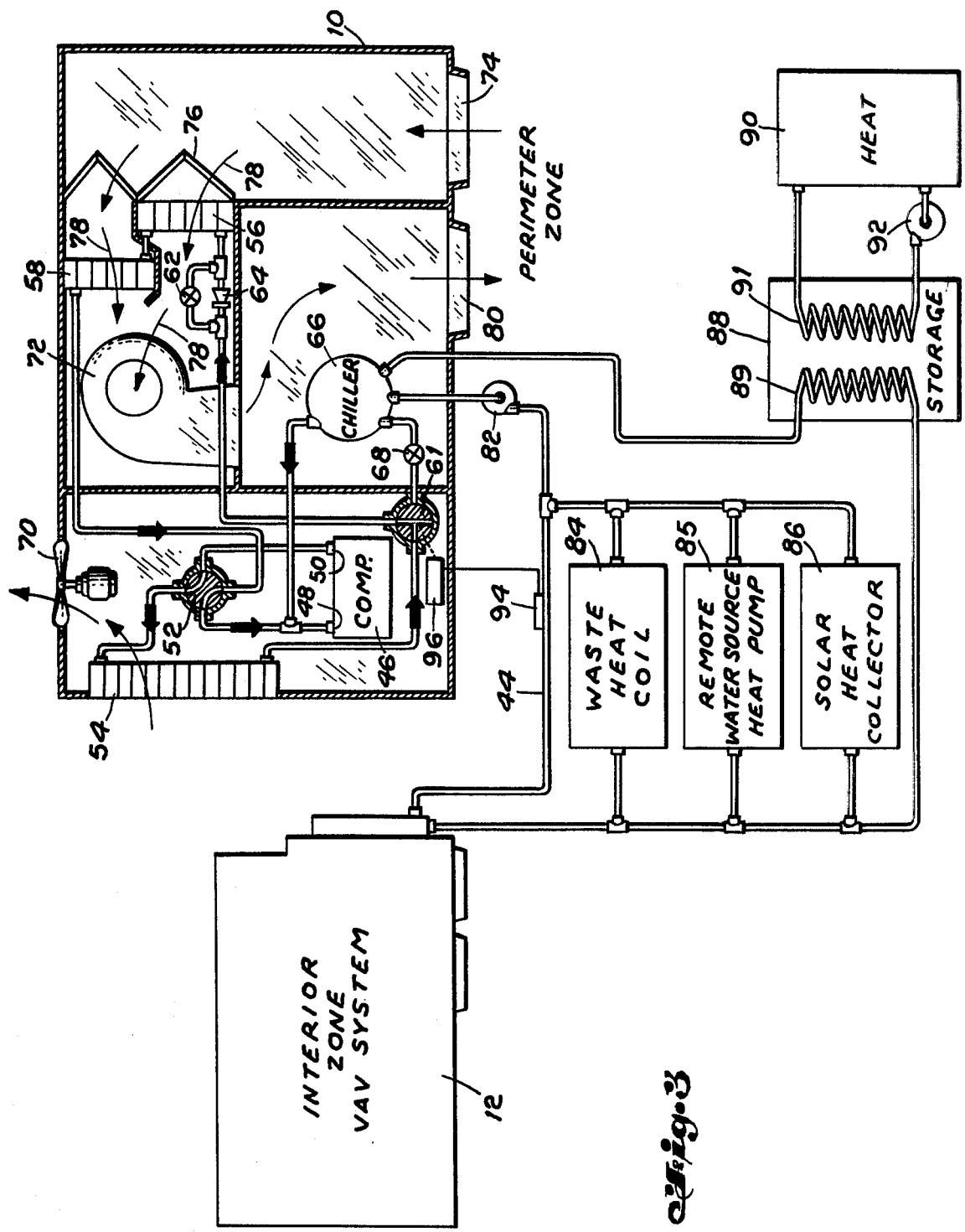

MULTI-SOURCE HEAT PUMP HVAC SYSTEM

This is a continuation, of application Ser. No. 698,233, filed June 21, 1976 now abandoned.

BACKGROUND OF THE INVENTION

1. Field of the Invention

The present invention relates to HVAC systems and more particularly to an HVAC system using a multi-source heat pump.

2. Description of the Prior Art

Heretofore, most buildings utilized natural gas or oil fired heaters for space heating and electrically operated air-conditioning units for space cooling. Since the energy crisis, the cost of all forms of energy has risen sharply with the cost of oil increasing most drastically and the cost of electricity rising the least. The cost of natural gas which for years was the cheapest form of energy, may go considerably higher should it be deregulated by the Government and in many areas additional use of natural gas has been prohibited. Thus, electrical energy is becoming the most desirable and economical form of energy even for space heating purposes. Attempts have been made to use electric furnaces having electric resistance heaters; however, experience has indicated that these types of devices are inefficient and much too expensive for acceptable use.

Since most modern buildings require both heating and air-conditioning, the trend has been to use combined HVAC systems to provide the most economical heating, ventilation, and air-conditioning for the entire building. Various types of HVAC systems have been used such as standard four-pipe central heating and cooling systems and variable air volume cooling systems with baseboard radiation for heating. Multi-zone systems having both hot and cold decks and closed loop water source heat pumps have been used in an attempt to use excess heat from one zone for heating a cooler zone; however, these systems all suffered from various deficiencies ranging from expensive initial installation to poor economy of operation.

Since there was a requirement for both heating and cooling, it appeared as if reversible refrigeration systems, known as heat pumps, might provide the most economical solution especially since these devices use electrical energy and have very high coefficients of performance not realized by other types of heating devices. Most prior art residential heat pumps were of the air-to-air type wherein an outdoor heat exchange coil was used to either extract heat from the ambient air or to discharge heat to the air depending upon the particular mode of operation, and an indoor heat exchange coil was used to either heat or cool the room air. One difficulty experienced with this type of device was that when the outdoor coil was used to extract heat from the ambient air during cold ambient temperatures, the low operating temperatures caused frost to build up on the outdoor coil, necessitating the use of an energy-consuming defrost cycle which substantially limited the efficiency and usefulness of air-to-air heat pumps. When a water-to-air heat pump was used, the problems associated with frost build-up were avoided because the heat could be extracted from the water without having to operate at the low temperatures required for an air-to-air heat pump. However, a source of constant temperature water was required and it was usually necessary to provide a rooftop evaporative cooler for discharge of heat during the cooling mode of operation.

In an attempt to make more efficient use of heat pumps, systems were designed wherein a mechanical refrigeration type air conditioning system was provided for an interior zone with the condenser of said system being in heat exchange relationship with a closed water loop that functions as a water source for peripheral zone heat pumps. Such devices reduced energy consumption to a degree but still relied upon mechanical refrigeration and the heat discharged by the condenser to provide heat to the closed water loop used by the peripheral zone heat pumps.

None of the prior art HVAC systems took into consideration the fact that a substantial portion of the building heat was lost by exhausting warm air at various places throughout the building.

SUMMARY OF THE INVENTION

The present invention contemplates a unique heating, ventilating and air-conditioning system for non-residential buildings that provides a major breakthrough in the reduction of annual energy cost. The energy conservation is achieved through (1) reduction of mechanical cooling requirements; (2) recovery of waste heat; (3) economical utilization of heat storage, (4) use of the most efficient heating means; and (5) providing the option of using a solar heat collector.

The system is primarily adapted for use in larger non-residential type buildings that may be considered as having an outer perimeter zone and an interior zone. The perimeter zone is composed of all rooms or areas having an outside wall that is subjected to conductive heat transfer with the outdoor environment which results in a heat loss or heat gain when the outdoor temperature is below or above the indoor set point. The interior zone of the building is one that has no outside walls, but is entirely surrounded by the perimeter zone and is therefore substantially independent of outdoor temperature except for the variation in outdoor ventilation air temperature which is brought into the zone. The interior zone is primarily subjected to heat gains due to interior heating loads such as lights, machinery and the body heat of the occupants. Thus, the interior zone almost always requires cooling during occupied periods and during most unoccupied periods. Heating is rarely required in the interior zone so long as the perimeter zone is properly controlled.

Since the interior zone needs cooling almost all year round, there are a large number of hours during the year when the heat content of the outdoor air is sufficiently low that the required interior cooling may be provided using filtered outdoor air without mechanical refrigeration. This mode of operation has become known in the art as an economizer mode of operation. During the times when the outdoor air contains too much heat to provide satisfactory cooling, mechanical refrigeration may be provided. During these times, it is unlikely that the perimeter zone will require heat since little heat is being lost through the walls. When mechanical refrigeration is used, only a minimum amount of outside air is drawn into the system to satisfy ventilation requirements and most of the return air from the zone is re-cooled and recirculated. During the economizer mode of operation, however, most of the return room air is discharged to the atmosphere. It is during this mode of operation when the outside air is cool that the perimeter zone requires heat and the discharge of the warm interior zone return air is extremely wasteful and inefficient.

The present invention proposes that waste heat recovery coils be positioned at all discharge air outlets, not only at the interior zone air-conditioning unit discharge dampers but also in other places where warm interior air is discharged, such as bathroom and kitchen fan outlets. Thus, a substantial amount of heat that was lost in discharge air using prior art devices may be recovered using the waste heat recovery coils of the present invention. The waste heat recovery coils are connected in a closed liquid circulating loop which is also connected into a storage tank so that the waste heat may be extracted and stored in the circulating liquid during periods when the interior zone requires cooling and the perimeter zone does not require heating.

The present invention provides a unique multi-source heat pump which may advantageously be used to extract the waste heat stored in the closed liquid circulating loop and the storage tank for heating the peripheral zone. The unique multi-source heat pump is arranged so that during the cooling mode of operation, it operates as an air-to-air heat pump extracting heat from the peripheral zone air using indoor refrigerant-to-air evaporator coils and discharging said heat to the outdoor air using an outdoor refrigerant-to-air condenser. During the heating mode of operation, valves are actuated so that the refrigerant flow through the indoor coil is reversed and the indoor coil functions as a condenser to discharge heat to the peripheral zone air, and the refrigerant is directed through a refrigerant-to-liquid heat exchanger for extracting heat from the liquid circulating through the closed loop so that the heat pump operates as a liquid-to-air heat pump.

During the heating mode of operation, the compressor suction draws the refrigerant out of the outdoor condenser coil so that frost does not develop and the difficulties experienced with the prior art devices are eliminated since the outdoor coil is not used as a source of heat. The heat pump efficiently extracts heat from the liquid in the closed loop, which liquid may be a glycol-type solution, so that heat can be extracted from water contained in a storage tank down to and through freezing temperature so that the heat of fusion may also be extracted from the water. Since the outdoor air coil is used for discharging heat during the cooling mode of operation, the expensive rooftop evaporative coolers associated with prior art systems are eliminated.

The primary objective of the present invention is to provide a more efficient heating, ventilating and air-conditioning system.

Another objective of the present invention is to make maximum use of outdoor air for cooling purposes to thereby reduce the mechanical refrigeration load.

Another objective of the present invention is to provide means for recovering heat from exhausted air.

Another objective of the present invention is to provide a heat storage means for improving the overall economy of a heating, ventilating and air-conditioning system.

Another objective of the present invention is to provide a multi-source heat pump that takes advantage of the desirable features of an air-to-air heat pump and a liquid-to-air heat pump and to combine these desirable features to provide an economy of operation not heretofore realized.

Another objective of the present invention is to provide an HVAC system with which a solar heat collector may be conveniently used.

Other objectives and advantages of the present invention will become apparent from the following description taken in conjunction with the drawings referred to therein.

BRIEF DESCRIPTION OF THE DRAWINGS

FIG. 1 is a schematic diagram of the system of the present invention in a cooling mode of operation.

FIG. 2 is a schematic diagram of the present invention in a heating mode of operation.

FIG. 3 is a schematic diagram of the present invention in which a remote water source heat pump has been connected into the closed loop.

DESCRIPTION OF THE INVENTION

Referring to FIG. 1, there is shown the system of the present invention as it operates when the outdoor temperature is above approximately 65° F. A perimeter zone is being cooled by a multi-source heat pump 10 and an interior zone is being cooled by a variable air volume air-conditioning unit 12 of the type having an economizer mode of operation. It is to be understood that the interior zone air-conditioning unit may be any standard variety of air-conditioning unit that is provided with an economizer mode of operation and that the variable air volume feature is not necessarily required for the practice of the present invention.

Referring to the variable air volume unit 12, the refrigerant flow is indicated by the solid arrows superimposed upon the refrigerant lines. The refrigerant circuit includes a multi-stage compressor 14 which provides compressed refrigerant to an outdoor air condensing coil 16, which condenses the refrigerant in the normal manner. Coil 16 is further connected to serially connected evaporators 18 and 20, which extract heat by the evaporation of the refrigerant which is then drawn to the suction side of compressor 14. A fan 22 is provided for drawing outdoor air over the condenser coil 16 for condensing the refrigerant. The variable air volume unit includes a blower 24 for drawing air to be cooled through outside air dampers 30, and return air dampers 32, filters 28 and evaporators 18 and 20 as shown by the arrows 26. Dampers 30 and 32 operate in a complementary manner to control the ratio of outdoor and return air to provide the desired amount of ventilation air when mechanical cooling is being used and to provide the desired cooling during an economizer mode of operation. When mechanical refrigeration is being used, such as when the outdoor air temperature is above 65° F, the outdoor air dampers 30 will be set at a minimum position to provide the minimum amount of ventilation air required by local ventilating codes. Blower 24 provides cooled air to a set of variable air volume dampers 34 which pass only the volume of cooled air to the supply outlet 36 that is necessary to satisfy the cooling requirements of the interior zone. A return inlet 38 is connected to the interior zone for returning warm interior zone air to the variable air volume cooling unit. The delivery of return air to unit 12 is assisted by a return air fan 40 which prevents pressure build-ups in the interior zone which could result from the modulation of the variable air volume dampers 34. Unit 12 may be similar to a variable air volume system described in the commonly assigned copending U.S. patent application Ser. No. 679,592 filed Apr. 23, 1976.

The present invention uses a waste heat recovery coil 42 disposed within the exhaust air outlet for extracting heat from the exhausted return air. It is contemplated that the waste heat recovery coil will have a size of approximately one square foot per ton of refrigeration of the variable air volume unit 12.

The waste heat recovery coil 42 is connected in a closed liquid circulating loop 44 which will be described in greater detail subsequently.

Thus, it is seen that energy conservation is realized by reducing the use of mechanical refrigeration through the use of the economizer mode of operation for cooling the interior zone and by providing a means for recovering waste heat which would normally be exhausted to the atmosphere. The variable air volume system additionally saves fan energy by reducing the volume of air being delivered to the interior zone in response to the actual cooling requirements of the zone. The variable air volume unit 12 makes maximum use of free cooling when the outdoor temperature is satisfactory for such a mode of operation and also provides for the recovery of free waste heat which would normally be discharged to the atmosphere.

When the outdoor temperature is above 65°, unit 12 operates in the same manner as a standard variable air volume air conditioner with very little outside air being drawn in through dampers 30 and therefore only a small volume of air being exhausted through the waste heat recovery coil 42 so that not a great deal of heat will be recovered during this mode of operation. However, it should be understood that during this mode of operation, it is doubtful if the perimeter zone will require heat since the ambient temperature nearly equals the set point and little heat will be lost through the walls. The heat that is lost will, in all likelihood, be supplied by internal heat gain from lights, people, etc.

The perimeter zone heating and cooling is provided for by a unique multi-source heat pump 10 which is shown in the cooling mode of operation in FIG. 1. The heat pump has a multi-stage compressor 46 having a suction inlet 48 and a discharge outlet 50. A four-way reversing valve 52 connects the discharge 50 to an outdoor condenser coil 54 for condensing the compressed refrigerant and providing liquid refrigerant to serially connected indoor evaporator coils 56 and 58 through a three-way valve 60 and an expansion valve 62. A reverse flow check valve 64 is connected in parallel with the expansion valve 62 to bypass the expansion valve during a reverse flow of the refrigerant. The outlet of indoor evaporator coil 58 is connected to the suction side 48 of the compressor 46 through the four-way reversing valve 52. The suction inlet 48 of the compressor is also connected to an outlet of a chiller 66 which has an inlet connected to the three-way valve 60 through an expansion valve 68. Chiller 66 is a liquid-to-refrigerant heat exchanger and is connected in the closed liquid circulating loop 44. During the mode of operation shown in FIG. 1, the compressor suction empties refrigerant from chiller 66 through the suction inlet 48 of the compressor. A condenser fan 70 is provided for drawing outdoor air over the condenser coil 54 for extracting heat from the refrigerant and condensing the same.

For charge balance, the system may use conventional receivers or accumulators and, if necessary, a storage volume may be connected to the gas line to the outdoor coil, or to the gas line of the indoor coil or both which will fill or empty as appropriate. Proper design choice of the above by one skilled in the art will assure proper system refrigerant charge in either mode of operation. A blower 72 is provided for drawing perimeter zone air through a return inlet 74, filters 76, and evaporators 56 and 58 so that the air may be conditioned. The air flow is shown by arrows 78. The blower 72 delivers the conditioned air from the indoor evaporator coils to a discharge outlet 80 for delivery to the perimeter zone of the building.

The cooling mode of operation of the multi-source heat pump 10 is similar to that of a standard air-to-air heat pump with the indoor evaporator coils extracting heat from the zone air and the outdoor condenser coil rejecting heat directly to the outside air. The chiller is effectively out of the refrigerant circuit and is emptied of refrigerant by the suction line of the compressor. Thus, the unit provides for efficient discharge of heat to the outdoor air by a refrigerant-to-air heat exchanger and does not require an intermediate fluid to carry the rejected heat to an expensive rooftop evaporative cooler.

The closed liquid circulating loop 44 includes a circulating pump 82 and a plurality of additional waste heat recovery coils 84 connected in parallel with the waste heat recovery coil 42 of the variable air volume unit 12. The waste heat recovery coils 84 are disposed in exhaust air outlets of the building such as at toilet and kitchen exhaust fans. It is also contemplated that a solar heat collector 86 may also be connected in parallel with the waste heat recovery coils 84 and 42 to provide the additional benefit of solar heating. The closed loop 44 is connected to a storage tank 88 through a heat exchange coil 89 which may be filled with water or another heat storage media which preferably has a high heat of fusion. Heat exchanger 89 is not required in the storage tank 88 which may be connected directly in the closed loop 44; however, by providing the heat exchanger, the storage media and the circulating liquid may be a different substance. It also reduces the volume of circulating liquid that is required so that glycol in economic quantities may be used to prevent freezing in the outdoor piping and allow the circulating liquid temperature to be reduced below the freezing point of the storage media so that the heat of fusion may be extracted from the storage media in the storage tank 88, thereby substantially increasing the heat storage capability of the system.

It may also be desirable to include a supplemental heat source 90 for providing additional heat to the circulating liquid on extremely cold days. The supplemental heat may be injected through a heat exchanger 91 contained in the storage tank 88 through the medium of a liquid circulated by a pump 92. The supplemental heat source 90 may be designed to use whatever fuel is most economical in a given location and could be oil, natural gas or electric.

Thus, during the mode of operation illustrated in FIG. 1 where cooling is required in the perimeter zone, the multisource heat pump 10 operates as a standard air-to-air heat pump for providing the required space cooling, and the variable air volume air-conditioning system 12 will, in all likelihood, be using mechanical refrigeration to provide the necessary cooling for the interior zone since the outdoor air temperature is above 65° F and contains too much heat to be used for cooling the interior zone. Only a small volume of air will be discharged through the waste heat recovery coil 42 for providing heat to the heat storage medium contained in storage tank 88 through the closed loop 44; therefore, during this mode of operation, where heating is not required, it may be desirable to effect further economies by shutting down the circulating pump 82 in the closed loop 44.

Referring to FIG. 2, there is shown the system of FIG. 1 connected in the operational mode wherein heat is provided to the perimeter zone and cooling is provided to the interior zone. The variable air volume air-conditioning unit 12 is shown operating in the economizer mode of operation and the outside air temperature is below 65° F. Outside air is drawn in through outside air dampers 30 and is mixed with return air, which is drawn through dampers 32, to provide cooled air which is delivered to the interior zone through discharge outlet 26. The volume of cooled air that is delivered is controlled by dampers 34 to satisfy the cooling load of the interior zone. During this mode of operation, a substantial volume of return air at a temperature of 70° F to 80° F is discharged from the interior zone through the waste heat recovery coil 42 so that the circulating liquid absorbs a portion of the heat therefrom. The heat is temporarily stored in the circulating liquid and subsequently transferred to the media in storage tank 88. Thus, energy is conserved by not requiring mechanical refrigeration for cooling the interior zone and the waste heat of the interior zone is extracted by the recovery coil and stored in the closed loop. The circulating liquid in the closed loop also picks up heat from the air exhausted through the waste heat coils 84 and if a solar heat collector 86 is used, additional heat will be absorbed by the circulating liquid. The heat contained in the circulating liquid of the closed loop may either be stored in tank 88 or used immediately by the perimeter zone heat pump 10.

Referring now to the perimeter zone heat pump 10 which has been switched to the heating mode of operation by activating the four-way and three-way reversing valves to reverse the refrigerant flow through evaporators 56 and 58. The valves may be controlled by thermostats contained within the perimeter zone. In the heating mode of operation, the heat pump 10 operates as a liquid-to-air heat pump with the indoor coils 56 and 58 functioning as condensers to discharge heat into the perimeter zone air and the chiller 66 operating as a liquid-to-refrigerant heat exchanger for extracting heat from the circulating liquid. The refrigerant flow as shown by the solid arrows is from the discharge outlet 50 of the compressor 46 through the four-way reversing valve 52 through the indoor coils 58 and 56 which function as condensers. The condensed refrigerant then flows through the reverse flow check valve 64 to the three-way valve 60 to the chiller 66 through an expansion valve 68 and thereafter back to the suction side 48 of the compressor 46. It is to be noted that the condenser 54 is connected to the suction side 48 of the compressor 46 through the four-way reversing valve 52 so that the refrigerant is sucked out of the condenser 54, effectively removing the condenser from the refrigerant circuit.

Thus, the difficulties encountered with the prior art devices that required a defrost cycle for the outdoor condenser are eliminated since the outdoor refrigerant-to-air heat exchanger is not used in the liquid-to-air mode of operation of the multi-source heat pump 10. The evaporation of the refrigerant takes place in the chiller 66 rather than in the outdoor condenser 54 and the chiller 66 cools the liquid circulating in the closed loop 44 to a temperature between 30° F and 70° F. Using a circulating liquid at these temperatures facilitates the extraction of significant amounts of heat by the waste heat recovery coils without the generation of frost on said coils. Thus, the system does not require a defrost cycle as does the conventional air-to-air heat pump.

The water source heat pump connected to a closed loop provides an additional advantage over the conventional air-to-air heat pump which cannot store heat in its air source. The closed loop used with a water source heat pump uniquely provides for the storage of heat. When the heat required by the perimeter zone is less than the capacity of the heat pump, the compressor 46 shuts down in stages and thereby extracts less heat from the circulating liquid in the closed loop 44, thereby permitting the absorption of excess waste heat by the heat storage medium in the storage tank 88. The stored heat may be used when the perimeter zone requires maximum heat delivery by extraction of heat out of the heat storage medium in tank 88. If glycol is used as the circulating liquid in the closed loop 44, heat may be extracted from the storage medium in tank 88 to reduce the temperature down and below that of freezing, thereby making available the heat of fusion to the heat pump system. Alternatively, for extremely cold days the supplemental heat source 90 may be made available should insufficient heat be rejected from the interior zone.

The circulating liquid in closed loop 44 is maintained at a relatively low temperature so that the system is particularly efficient when used with a solar heat collector. The liquid absorbs and stores heat during the daytime when the heating load of the system is at a minimum and the solar heat is maximum, thereby making it available for use during the nighttime when the building heat loss is a maximum.

An analytical study indicates that the system of the present invention may reduce the energy requirement for the annual HVAC function by 25% as compared to a closed loop water source heat pump system under identical operating conditions and that additional energy saving could be realized by the use of a storage medium for storing extracted heat. Thus, savings of 30% over the cost of operating a closed loop water source heat pump may be realized and the savings over the conventional four-pipe or dual-duct systems would be over 40% of the energy cost. These figures do not take into account the energy savings that may be realized using a solar heat collector, which savings will vary considerably from geographical area to geographical area.

The system of the present invention is also competitive when comparing first or initial installation cost. Expensive rooftop evaporator coolers are not required as with water source heat pumps and only a single liquid circulating loop is required compared to a four-pipe system.

The control system for the present invention is similar to standard control systems used with variable air volume airconditioning units and with reversible heat pumps. For the interior zone, the variable air volume unit 12 is operated in the conventional manner with standard controls as described in the previously mentioned U.S. patent application. The controls for the perimeter zone multi-source heat pump 10 may be similar to those of standard reversible heat pumps. The only additional control that may be desirable is a control for the fluid circulating pump 82 which should run continuously during periods when the compressor of the multi-source heat pump 10 is operating in the heating mode. When the heat pump is in the cooling mode and the liquid temperature reaches a predetermined high temperature, such as 70° to 80° F, the circulating pump may be turned off. It may also be desirable to provide a control for the supplemental heat source 90 to maintain the circulating liquid at a predetermined minimum temperature.

Thus, the system of the present invention uses the most economical of all known cooling systems for the interior zone, that being a variable air volume air-conditioning unit capable of operating in an economizer mode to provide the maximum amount of free cooling available. The system uniquely provides for the use of waste heat recovering coils disposed within exhaust air paths to recover heat which may be used to heat the perimeter zone. The perimeter zone is conditioned by heat pump 10 which appears to be the most efficient heating and cooling means currently available and the efficiency of the system is further enhanced by uniquely designing the heat pump 10 as a multi-source heat pump which operates as an air-to-air heat pump during the cooling mode of operation and as a liquid-to-air heat pump during the heating mode of operation to take advantage of the favorable characteristics of both of these types of heat pumps and thereby eliminating the requirement for a rooftop evaporative cooler generally associated with water source heat pumps and eliminating the need for a defrost cycle generally associated with air-to-air heat pumps. The overall system economy is further enhanced by the use of a closed water loop for extracting waste heat from the interior zone and storing said heat for use by the multi-source heat pump. The heat storage capability of the closed loop is enhanced through the use of a storage tank containing a heat storage medium. Further economies may be realized by the use of a solar heat collector in the closed loop. The system of the present invention has an advantage in that heat extracted at one time may be stored for use at a later time. This storage capability is not available in air-to-air heat pumps. Another advantage of the system is that the variable air volume unit 12 for the interior zone is essentially independent of the perimeter zone multi-source heat pump in that the compressor 14 of the variable air volume unit 12 need not be operating in order to extract heat from the interior zone as was the case in many of the prior art devices where the operation of the interior cooling and the exterior heating units were mutually dependent upon each other, thereby requiring mechanical refrigeration for the interior zone in order to provide heat for the perimeter zone.

Referring to FIG. 3, there is shown a modification of the embodiment shown in FIGS. 1 and 2 wherein a remote water source heat pump 85 has been connected into the closed liquid circulating loop 44. The remote water source heat pump is a standard independently operating water source heat pump which may be physically located in a remotely located space for providing both heating and cooling to said space. The interior zone VAV system 12 is identical to the system shown in FIGS. 1 and 2 and the multi-source heat pump 10 is substantially similar to that shown in FIGS. 1 and 2, with the exception that the three-way valve 60 has been replaced with a valve 61 as shown in FIG. 3.

Operation of the remote water source heat pump is completely independent of the multi-source heat pump 10. When the remote space requires cooling, the remote water source heat pump adds heat to the circulating liquid contained in closed liquid circulating loop 44 and when the space requires heating, the remote water source heat pump 85 extracts heat from the liquid in loop 44 in a manner similar to that of the multi-source heat pump 10.

FIG. 3 shows the multi-source heat pump 10 in the cooling mode of operation wherein valve 61 is positioned to supply refrigerant flow from condenser coil 54 to the indoor evaporator coils 56 and 58. When the multi-source heat pump 10 is in the heating mode of operation, the refrigerant flow is as shown in FIG. 2 and valve 61 is positioned so that the refrigerant may flow from the indoor coils 56 and 58 to the chiller 66 as shown in FIG. 2.

During periods of high outdoor temperature, when both the multi-source heat pump and the remote water source heat pump are cooling their respective zones, the heat discharged into the circulating liquid by the remote water source heat pump accumulates since the liquid is not being cooled by chiller 66. In this mode of operation, the refrigerant bypasses the chiller 66 and flows directly to the evaporator coils 56 and 58 from condenser 54. In the embodiment shown in FIG. 3, where one or more remote water source heat pumps may be discharging heat into the circulating liquid, a temperature sensor 94 is provided to sense the temperature of the circulating liquid. A valve controller 96 is responsive to a predetermined high level temperature signal from sensor 94 and to a signal indicating that the multi-source heat pump is in the cooling mode to control valve 61 to divert refrigerant from the indoor coil 56 to the chiller 66 for a period of time long enough to reduce the liquid temperature to an acceptable lower level. Thus, valve 61 is designed to provide a third position in which refrigerant may be directed from the coil 54 to the chiller 66.

Thus, when it is contemplated that remote water source heat pumps may be used in the system of the present invention, the condenser coil 54 and the compressor 46 of the multi-source heat pump should be designed to have sufficient capacity to provide the additional cooling load that may be required for the remote spaces to be cooled by the water source heat pumps. Thus, this embodiment of the invention provides a simple means for heating and cooling remotely located spaces without requiring the installation of excessively long air ducts from the multisource heat pump 10.

Thus, the present invention provides a less expensive system that may be easily installed in non-residential buildings and which will provide substantial savings in operating cost over the prior art systems.

What is claimed is:
1. A multi-source heat pump air-conditioning system, comprising:
   a refrigerant circuit;
   a refrigerant compressor disposed in said circuit;
   a first heat exchanger of the refrigerant-to-air type connected in said circuit and disposed in heat exchange relation with air to be conditioned;
   a second heat exchanger of the refrigerant-to-air type disposed in heat exchange relation with ambient air;
   a third heat exchanger of the liquid-to-refrigerant type disposed in heat exchange relationship with a circulating liquid; and means for selectively connecting in a first mode of operation the second heat exchanger into the refrigerant circuit so that the refrigerant circulates in the refrigerant circuit serially through the compressor, the second heat exchanger and the first heat exchanger and in a second mode of operation the third heat exchanger in the refrigerant circuit so that the refrigerant circulates serially through the compressor, the first heat exchanger and the third heat exchanger, whereby the heat pump is selectively operated in the first mode of operation as an air-to-air heat pump for cooling the air to be conditioned and discharging the heat to ambient air and in the second mode of operation as a liquid-to-air heat pump for extracting heat from the liquid and heating the air to be conditioned.

2. A multi-source heat pump as described in claim 1, wherein said means additionally comprises means for connecting the heat exchanger that is not in the refrigerant circuit to a suction side of the compressor for evacuating refrigerant from said heat exchanger.

3. A multi-source heat pump as described in claim 1, additionally comprising:
means for circulating ambient air through said second refrigerant-to-air heat exchanger during the first mode of operation; and
means for circulating a liquid through the third liquid-to-refrigerant heat exchanger during the second mode of operation 4. A multi-source heat pump as described in claim 1, additionally comprising blower means for circulating air to be conditioned through the first refrigerant-to-air heat exchanger.

5. A multi-source heat pump as described in claim 1, additionally comprising:
a thermal expansion valve connected in series with the first refrigerant-to-air heat exchanger; and
a reverse flow check valve connected in parallel with the thermal expansion valve to block refrigerant flow in one direction and to allow refrigerant to bypass the expansion valve when flowing in the opposite direction.

6. A multi-source heat pump as described in claim 1, additionally comprising a source of circulating liquid connected to said third liquid-to-refrigerant heat exchanger.

7. A multi-source heat pump as described in claim 6, wherein the source of circulating liquid comprises a closed liquid circulating loop including a waste heat recovery coil adapted to be positioned in path of warm air being exhausted from a building whereby said circulating liquid flows through the waste heat recovery coil extracting heat from the exhausted air and thereafter flows through the third liquid-to-refrigerant heat exchanger for providing heat thereto.

8. A multi-source heat pump as described in claim 7, additionally comprising storage means for storing heat extracted by the waste heat recovery coil.

9. A multi-source heat pump as described in claim 7, wherein the waste heat recovery coil is disposed in the exhaust air path of an independent air-conditioning system.

10. A multi-source heat pump as described in claim 6, additionally comprising supplemental heat means for providing supplemental heat to the circulating liquid.

11. A multi-source heat pump as described in claim 7, additionally comprising a plurality of waste heat recovery coils adapted to be disposed in a plurality of air exhaust paths and connected in the closed loop.

12. A multi-source heat pump as described in claim 8, wherein the circulating liquid in the closed loop contains an anti-freeze solution and the storage means contains a heat storing medium from which heat may be extracted including the heat of fusion.

13. A multi-source heat pump as described in claim 7, additionally comprising a solar heat collector means connecting to said closed loop for providing solar heat to the circulating liquid.

14. A multi-source het pump as described in claim 6, additionally comprising a water source heat pump connected in·the closed liquid circulating loop for selectively heating and cooling a remote space.

15. A multi-source heat pump as described in claim 1, additionally comprising a thermal expansion valve connected in series with the third liquid-to-refrigerant heat exchanger.

16. A multi-source heat pump air-conditioning system, comprising:
compressor means having a discharge outlet and a suction inlet;
first air-to-refrigerant heat exchange means having first and second refrigerant connection means and being adapted to be subjected to air to be conditioned;
second air-to-refrigerant heat exchange means having first and second refrigerant connection means and being arranged to be subjected to ambient air;
a liquid-to-refrigerant heat exchange means having first and second refrigerant connection means and arranged to be connected to a liquid source;
means for connecting the compressor discharge outlet to the first refrigerant connection means of said first air-to-refrigerant heat exchange means and the compressor suction inlet to the first refrigerant connection means of the second air-to-refrigerant heat exchange means in a first mode of operation and for connecting the compressor discharge outlet to the first refrigerant connection means of said second air-to-refrigerant heat exchange means and the compressor suction inlet to the first refrigerant connection means of the first air-to-refrigerant heat exchange means in a second mode of operation;
means for connecting the second refrigerant connection means of the first air-to-refrigerant heat exchange means to the second refrigerant connection means of the second air-to-refrigerant heat exchange means in the first mode of operation and to the second refrigerant connection means of the liquid-to-refrigerant heat exchange means in the second mode of operation; and
means for connecting the first refrigerant connection means of the liquid-to-refrigerant heat exchange means to the suction inlet of the compressor, whereby said multi-source heat pump may be selectively operated as an air-to-air heat pump for cooling the air to be conditioned or as a liquid-to-air heat pump for heating the air to be conditioned.

17. In an air-conditioning system of the type adapted to provide fresh uncooled air to a zone to be conditioned and including means for removing warm zone air from the conditioned zone and exhausting at least a portion of the removed warm zone air to the atmosphere, the improvement comprising:

a waste heat recovery means disposed in the path of the exhausted warm zone air for recovering heat therefrom;

heat pump means for chilling a liquid and extracting usable heat therefrom; and liquid circulating means interconnecting said waste heat recovery means and said heat pump means for circulating a liquid through said heat recovery means and said heat pump means so that the chilled liquid from the heat pump means may absorb heat from the warm exhausted zone air passing through the waste heat recovery means and the heat pump means may extract the heat from said circulating liquid.

18. A heating, ventilating and air-conditioning system adapted for use in a building of the type that has an interior zone and a peripheral zone surroundin said interior zone, said system comprising:

air-conditioning means in heat transfer relation with the air to be conditioned in the interior zone, said means including means for exhausting at least a portion of the air contained in said interior zone;

a waste heat recovery means disposed in the path of the exhausted air from the interior zone and being connected in a closed liquid circulating loop for extracting heat from the exhausted air;

a multi-source heat pump means disposed in heat transfer relation with the air to be conditioned in the perimeter zone, said heat pump means being of the type that operates as an air-to-air heat pump when cooling is required and as a fluid-to-air heat pump when heating is required, said heat pump including a liquid-to-refrigerant heat exchange means connected to said closed liquid circulating loop so that heat may be extracted from the circulating liquid, whereby the heat extracted from the exhausted air of the interior zone may be used to provide heating for the perimeter zone.

19. A system as described in claim 18, additionally comprising a heat storage means associated with said closed liquid circulating loop for storing excess heat extracted from the exhausted air.

20. A system as described in claim 18, additionally comprising supplemental heating means for providing additional heat to the liquid circulating in the closed liquid circulating loop.

21. A system as described in claim 18, additionally comprising a solar heat collector connected in the closed liquid circulating loop.

22. A system as described in claim 18, comprising a plurality of waste heat coils disposed in paths of exhaust air from said building.

23. A system as described in claim 18, additionally comprising a water source heat pump connected in the closed liquid circulating loop for selectively cooling and heating an additional zone.

24. A system as described in claim 23, wherein the multisource heat pummp includes means responsive to the circulating liquid temperature for cooling the circulating liquid, whereby excessive liquid temperature is avoided during periods when the water source heat pump is providing cooling.

25. In an air-conditioning system of the type adapted to provide cool, fressh, outdoor air to a room when the heat content of the outdoor air is sufficiently low to provide cooling for said room without the need for cooling the outdoor air and including means for removing warm room air and exhausting at least a portion of the warm room air to the atmosphere, the improvement comprising:

a waste heat recovery means disposed in the path of the warm exhausted room air for recovering heat therefrom;

heat pump means for chilling a liquid and extracting usable heat therefrom; and liquid circulating means interconnecting said waste heat recovery means and said heat pump means for circulating a liquid through said heat recovery means and said heat pump means so that the chilled liquid from the heat pump means may absorb heat from the warm exhausted room air passing through the waste heat recovery means and the heat pump means may extract the heat from said circulating liquid.

* * * * *